United States Patent

[11] 3,604,617

| [72] | Inventor | Williams G. Patterson<br>Palo Alto, Calif. |
|---|---|---|
| [21] | Appl. No. | 814,555 |
| [22] | Filed | Apr. 9, 1969 |
| [45] | Patented | Sept. 14, 1971 |
| [73] | Assignee | Beckman Instruments, Inc. |

[54] ULTRACENTRIFUGE TRANSMISSION ASSEMBLY
7 Claims, 2 Drawing Figs.

[52] U.S. Cl. ..................................................... 233/23,
74/606, 184/13
[51] Int. Cl. ....................................................... B04b 3/00
[50] Field of Search ........................................... 233/23, 17,
11, 24, 21; 74/606; 210/398, 399; 184/13

[56] References Cited
UNITED STATES PATENTS

| 3,103,489 | 9/1963 | Pickels | 233/21 |
| 3,135,689 | 6/1964 | Antinori | 233/24 X |
| 3,489,034 | 1/1970 | Moore | 74/606 |

FOREIGN PATENTS

| 948,789 | 2/1964 | England | 233/23 |

Primary Examiner—Jordan Franklin
Assistant Examiner—George H. Krizmanich
Attorney—Flehr, Hohbach, Test, Albritton & Herbert

ABSTRACT: A transmission assembly for a high-speed centrifuge wherein the interior of the transmission is maintained under the same vacuum as the vacuum chamber of the centrifuge, with the dynamic vacuum seal being provided around the relatively slowly turning transmission input shaft.

PATENTED SEP 14 1971
3,604,617
FIG. 1
FIG. 2
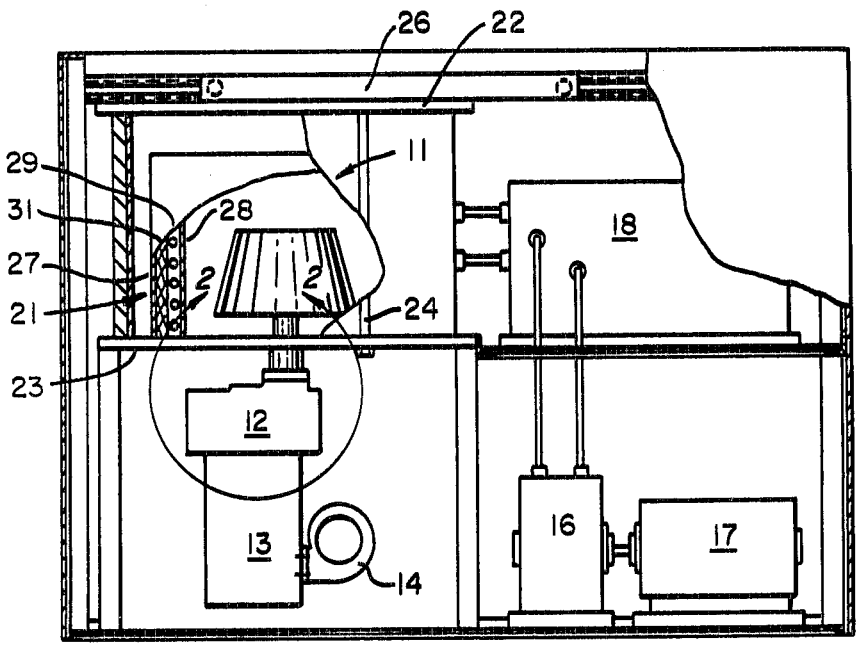
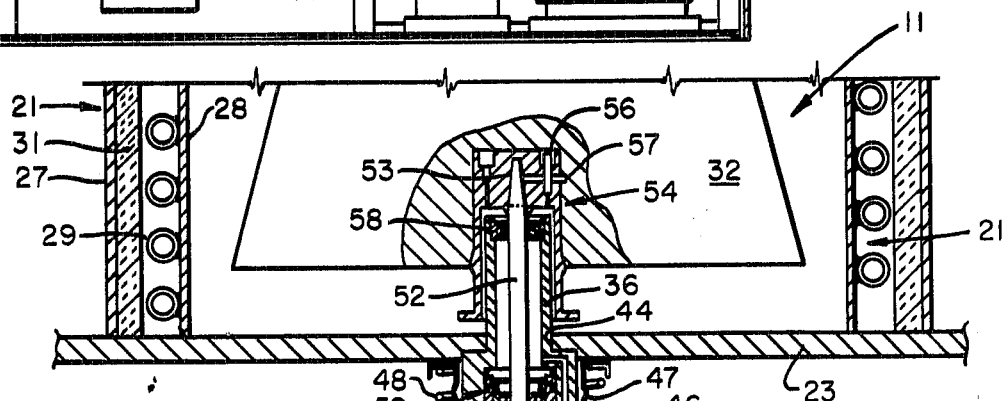
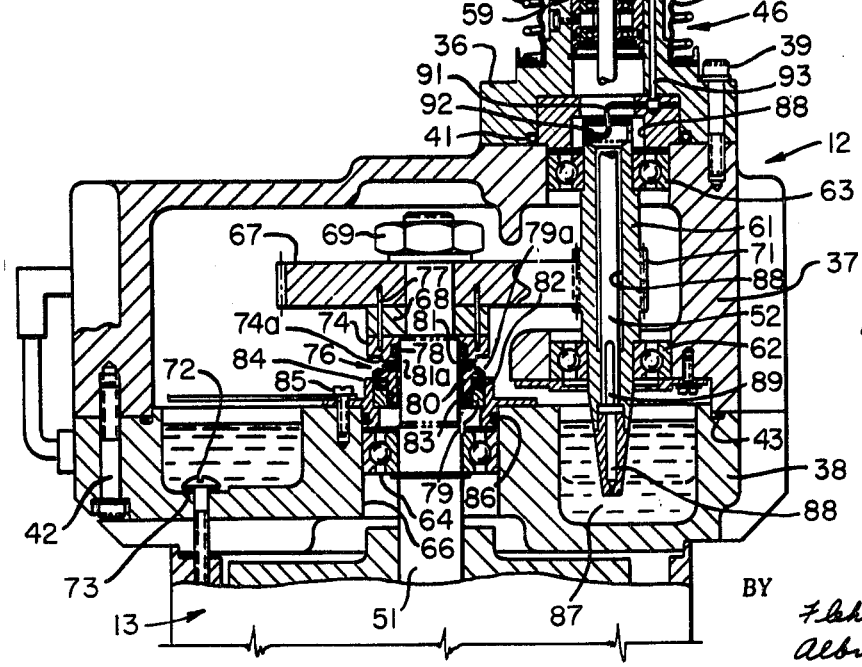
WILLIAMS G. PATTERSON
INVENTOR
BY
Flehr, Hohbach, Vest,
Albritton & Herbert
ATTORNEYS

ULTRACENTRIFUGE TRANSMISSION ASSEMBLY

BACKGROUND OF THE INVENTION

This invention pertains generally to centrifuges and more particularly to a transmission assembly for a high-speed centrifuge.

Heretofore, ultracentrifuges have been provided in which a rotor spins at high speeds on the order of 50,000 r.p.m. in an evacuated chamber, and power is transmitted to the rotor through a flexible drive shaft. Dynamic vacuum seals have been provided around the high-speed flexible drive shaft at the point where it enters the chamber housing. Serious problems have been encountered with this type of seal because of the high speed and vibration at this point.

There is, therefore, a need for a new and improved ultracentrifuge which overcomes the above and other problems encountered with high-speed centrifuges heretofore provided.

SUMMARY AND OBJECTS OF THE INVENTION

The present invention provides an ultracentrifuge in which the entire transmission housing is maintained under the same vacuum as the evacuated chamber, with the dynamic vacuum seal being provided at the input shaft of the transmission. This shaft rotates substantially slower than does the output shaft, and more effective sealing can be obtained at this point. In addition, because the gears and other rotating components in the transmission operate in a vacuum, windage losses are reduced and the power transmission efficiency is increased. The absence of air turbulence permits improved distribution of lubricating oil in the transmission, and a centrifugal lubrication system is provided for delivering oil to the upper portion of the transmission housing.

It is in general an object of the invention to provide a new and improved ultracentrifuge.

Another object of the invention is to provide an ultracentrifuge of the above character which requires no dynamic vacuum seal around its high-speed drive shaft.

Another object of the invention is to provide an ultracentrifuge of the above character in which a dynamic vacuum seal is provided at the input shaft of the transmission and the transmission housing is maintained under vacuum.

Another object of the invention is to provide an ultracentrifuge of the above character which includes a centrifugal lubrication system.

Additional objects and features of the invention will be apparent from the following description in which the preferred embodiment is set forth in detail in conjunction with the accompanying drawing.

BRIEF DESCRIPTION OF THE DRAWING

FIG. 1 is a front elevational view, partly sectioned, of one embodiment of an ultracentrifuge incorporating the present invention.

FIG. 2 is an enlarged sectional view of the transmission assembly of the embodiment shown in FIG. 1.

DESCRIPTION OF THE PREFERRED EMBODIMENT

In the preferred embodiment, the ultracentrifuge includes a vacuum chamber 11, a transmission 12, and a centrifuge motor 13. A blower 14 is provided for cooling the centrifuge motor. A pump 16, driven by motor 17, is provided for evacuating the chamber 11, and a refrigeration unit 18 is provided for cooling the interior of the chamber.

The vacuum chamber 11 includes a substantially cylindrical sidewall assembly 21, a top plate 22 and a bottom plate 23. The plates 22 and 23 are tightly clamped to the upper and lower surfaces of the sidewall by means of bolts 24. To assure a good vacuum seal, additional sealing means, not shown, can be provided between the sidewall and plates. The top plate 22 is formed to include an opening, not shown, which permits access to the interior of the vacuum chamber. A removable cover 26 is provided for closing this opening. The cover 26 is slidably mounted and adapted for dropping into the opening in the upper plate to seal the chamber.

The chamber wall assembly 21 includes an outer wall member 27 and an inner wall member 28. Refrigeration tubes 29 are provided intermediate the two wall members and attached to the inner wall 28. Steel barrier 31 is provided between the refrigeration tubes and the outer wall member 27 to protect against accidental explosion of the rotor.

A centrifuge rotor 32 is disposed within the vacuum chamber and adapted for high-speed rotation therein.

The transmission 12 is enclosed in a three-piece housing comprising an upper section or spud 36, a central section 37, and a lower section or pan 38. The top section 36 is attached to the central section 37 by means of cap screws 39. An O-ring 41 provides a good vacuum seal between the two sections. The lower section 38 is attached to the central section 37 by screws 42, and an O-ring 43 is provided to assure a hermetic seal between these sections.

An aperture 44 is provided in the lower plate 23 of the vacuum chamber. This bore is adapted for receiving the spud 36, with the upper portion of the spud extending into the vacuum chamber. A bellows assembly 46 provides a static seal between the spud section of the transmission housing and the lower plate of the vacuum chamber. This assembly includes a bellows member 47 fabricated of rubber or other flexible material and a resilient spring member 48 for urging the bellows member tightly against the spud section and bottom plate.

The transmission also includes an input shaft 51, an output shaft 52, and gearing means intermediate the shafts for causing the output shaft to rotate faster than the input shaft.

In the preferred embodiment, the output shaft 52 extends into the vacuum chamber 11 through an opening in the upper portion of the spud section 36. The centrifuge rotor 32 is mounted on the upper end 53 of the shaft 52 by means of a hub assembly 54. A pin 56 and lock 57 are provided for securing the hub to the shaft.

Vibration amplitudes of the upper portion of the output shaft 52 are limited by a bearing 58 mounted in a counterbore in the upper extremity of the spud section 36. A bearing assembly 59, located in the central portion of the spud section below the bottom plate 23 of the vacuum chamber, is provided for flexible support and damping of the drive shaft 52 in this region. The lower end of the output shaft 52 is coaxially mounted in the internal bore of an elongate member 61. This elongate member is rotatably mounted in bearings 62 and 63 which are mounted in the central transmission housing section 37.

The input shaft 51 is rotatably mounted in a bearing 64 which is mounted in a bearing bore 66 formed in the pan section 38 of the transmission housing. A driving gear 67 is mounted on the input shaft 51 by means of a drive collar 68 and a retaining nut 69. The gear 67 meshes with and is adapted for driving a gear 71 affixed to the output shaft 52. In a preferred embodiment, the gear 71 is formed integrally with the elongate member 61. The driving gear 67 has a pitch diameter on the order of four times the pitch diameter of the driven gear 71. Hence, the output shaft rotates at a speed on the order of four times the speed of the input shaft.

The input shaft 51 extends through the pan section 38 of the transmission housing and is adapted for connection to a motor. In the preferred embodiment, the shaft of the centrifuge motor 13 is itself used as the input shaft. The motor 13 is attached to the oil pan section of the transmission housing by means of screws 72. A seal 73 is provided under the head of each of these screws.

Dynamic vacuum seal means is provided between the input shaft 51 and the pan section of the transmission housing. This seal means includes an upper seal ring 74 and a lower seal assembly 76. The upper seal ring is mounted on the shaft 51 and adapted for rotation therewith. It is affixed to the drive coller 68 and spur gear 6 by means of pins 77. An O-ring 78 is disposed in an annular groove formed in the inner face of the seal ring 74 to provide a static seal between the ring and the shaft. The ring 74 is preferably fabricated of hardened steel and includes an annular lower surface 74a which is lapped and polished to provide a good sealing surface.

The seal assembly 76 includes a generally annular cup member 79, in which an annular bushing member 80 is disposed. An annular sealing ring 81 is press fitted into a counterbore in the upper portion of the annular bushing. This sealing ring is preferably fabricated of carbon and includes a highly polished and lapped upper surface 81a for engaging the lower surface 74a of the upper sealing ring 74. The dynamic vacuum seal is formed at the innerface of the surfaces 74a and 81a. A resilient spring member 82 is provided intermediate the cup member 79 and the bushing member 80 for urging the sealing surfaces 81a and 74a firmly together. Lips 79a are provided at the upper extremity of the cup member for retaining the bushing member in the cup.

The seal assembly 76 is mounted to the pan section of the transmission housing. The cup member 79 is press fitted into a mounting bracket 84 which mounts in the bearing bore 66. The mounting bracket is secured in place by means of screws 85. An O-ring 86 provides a static seal between the mounting bracket and the wall of the bore. While the seal assembly 76 surrounds the input shaft 51, it makes no contact with the shaft, the dynamic seal being formed between the upper sealing surface 81a of the assembly sealing ring and the lower sealing surface 74a of the upper seal ring.

A lubrication system is also provided in the preferred embodiment. This system includes a supply of oil 87 which is provided in the pan portion of the transmission housing. The lower end of the elongate member 61 is submerged in this oil supply. The member is formed to include a tapered or stepped axial bore having an increasingly larger diameter toward its upper end. In the region where the output shaft 52 is fitted into the bore 88, an oil passageway 89 is provided in the output shaft. This passageway is in communication with the bore both below and above the region of fitting.

A delivery tube 91 is provided at the upper end of the elongate member 61. This tube includes a receiving portion 92 disposed inside the upper portion of bore 88 and extending circumferentially between the output shaft and the wall of the bore. The delivery tube 91 is also in communication with a passageway 93 which is formed in the upper transmission housing section. This passageway provides means for delivering oil to the damper bearing assembly 59.

Operation of the lubrication system can be briefly described as follows. When the output shaft 52 rotates, the elongate member 61 rotates with it, and oil is pumped by centrifugal force up the walls of the bore 88. At the upper end of the elongate member, the velocity of the oil forces it through the delivery tube 91 and the passageway 93 to provide lubrication of the damper bearing assembly 59. The oil then runs downward by gravity, lubricating the bearings and gears in the central section of the transmission housing.

It is apparent from the foregoing that a new and improved ultracentrifuge transmission assembly has been provided wherein the interior of the transmission housing is in communication with the vacuum chamber and operates under the same vacuum. By placing the dynamic vacuum seal around the relatively slow moving input shaft of the transmission, an effective and longlasting seal is provided. In addition, since the gears and other rotating components in the transmission operate in a vacuum, windage losses are reduced and the power transmission efficiency is increased. There is no air turbulence in the transmission to interfere with the distribution of lubricating oil.

While the invention has been described with specific reference to the presently preferred embodiment, it will be apparent to those familiar with the art that certain changes and variations can be made without departing from the scope of the invention as defined by the following claims.

1. In a centrifuge having a vacuum chamber and a rotor adapted for rotation in said vacuum chamber, a transmission, a housing enclosing said transmission, the volume within said housing being in communication with said vacuum chamber and likewise under vacuum, said transmission including an input shaft extending through said housing, a motor outside said housing driving said input shaft, an output shaft connected to said rotor, and gearing means intermediate said shafts for causing said output shaft to rotate faster than said input shaft, and dynamic vacuum seal means intermediate said input shaft and said housing for sealing off the interiors of said chamber and housing from the outside atmosphere.

2. A centrifuge as in claim 1 wherein said vacuum seal means includes a first member affixed to said input shaft, and a second seal member carried by said housing and having a sealing surface rotatably engaging said first seal member.

3. A centrifuge as in claim 2 wherein said first seal member includes an upper seal ring having a lower sealing surface and said second seal member comprises an assembly including a sealing ring having an upper sealing surface for sealably engaging the lower sealing surface of said upper seal ring and resilient means for urging said upper and lower sealing surfaces together.

4. A centrifuge as in claim 1 together with a bellows sealing assembly surrounding said output shaft to provide a static vacuum seal between said chamber and said housing.

5. A centrifuge as in claim 1 together with lubrication means including a vertically oriented elongate member having a tapered axial bore, the lower end of said elongate member being submerged in a supply of oil in the lower portion of said transmission housing, said elongate member being coaxially connected to said output shaft and adapted for rotation therewith, whereby oil is pumped by centrifugal force up the walls of said tapered axial bore, and a delivery tube having a receiving portion disposed in the upper portion of said axial bore for delivering oil to the upper portion of said transmission housing.

6. An ultracentrifuge comprising a vacuum chamber, a rotor adapted for rotation in said vacuum chamber, a motor for driving said rotor, a transmission housing in communication with said vacuum chamber and likewise under vacuum, a drive shaft connected to said rotor and extending between said vacuum chamber and transmission housing, an input shaft extending through a wall of said transmission housing and connected to said motor outside said housing, gearing means intermediate said input shaft and said drive shaft for rotating said drive shaft at a speed greater than the speed of said input shaft, and dynamic vacuum seal means intermediate said input shaft and said transmission housing.

7. An ultracentrifuge as in claim 6 wherein said vacuum seal means includes a seal ring mounted on said input shaft and adapted for rotation therewith, said seal ring including an annular sealing surface, an O-ring intermediate said seal ring and said shaft for providing a static seal between said ring seal and said shaft, and a seal assembly mounted to said transmission housing and including an annular sealing ring having an annular sealing surface for engaging the sealing surface of said seal ring, and resilient means urging said sealing surfaces together.